United States Patent [19]

Wolner

[11] Patent Number: 4,539,732
[45] Date of Patent: Sep. 10, 1985

[54] DOUBLE LOCKING SAFETY SNAP

[75] Inventor: James T. Wolner, Red Wing, Minn.

[73] Assignee: D B Industries, Inc., Red Wing, Minn.

[21] Appl. No.: 575,304

[22] Filed: Jan. 30, 1984

[51] Int. Cl.³ .......................... A44B 13/02; B66C 1/36
[52] U.S. Cl. .............................. 24/241 R; 24/241 PP; 24/241 SB; 24/241 SL; 294/82.19; 294/82.36
[58] Field of Search ........... 24/241 R, 241 P, 241 PP, 24/241 SB, 241 S, 241 SP, 241 SL, 241 PL; 294/78 R, 83 R, 82 R

[56] References Cited

U.S. PATENT DOCUMENTS

| | | | |
|---|---|---|---|
| 1,289,096 | 12/1918 | Boatright | 24/241 SL |
| 1,711,346 | 4/1929 | Greve | 24/241 P |
| 1,949,608 | 3/1934 | Johnson | 24/241 SB |
| 3,341,244 | 9/1967 | Johnson | 294/82.36 |
| 3,575,458 | 4/1971 | Crook, Jr. | 24/241 PP |
| 4,062,092 | 12/1977 | Tamada et al. | 24/241 SB |
| 4,122,585 | 10/1978 | Sharp et al. | 24/241 PP |

FOREIGN PATENT DOCUMENTS

| | | | |
|---|---|---|---|
| 798247 | 7/1958 | United Kingdom | 294/82.2 |
| 1032584 | 6/1966 | United Kingdom | 294/82.19 |

*Primary Examiner*—Victor N. Sakran
*Attorney, Agent, or Firm*—Williamson, Bains, Moore & Hansen

[57] ABSTRACT

A double lock safety hook adapted to a single lock hook permitting a belt connection, such as a fall protection device, window washer's harness, and the like, to be retained within a hook throat. A snap keeper is engageable with the latch member to lock the latch member with the latch member abutting the hook nose so that accidental release of the belt connection is reduced. The snap keeper is mounted along and in juxtaposition to the shank of the single lock hook and is easily installed on equipment without the necessity of drilling holes in the hook body. A means for positioning the keeper along the shank is also provided for moving the keeper between its first and second positions.

10 Claims, 5 Drawing Figures

DOUBLE LOCKING SAFETY SNAP

BACKGROUND OF THE INVENTION

The invention relates to the field of double locking snap designs and provides a new anchoring device for retaining safety harnesses, load supports, lanyards, and the like.

The conventional "safety snap" used on most safety lanyards consists of a hook of specified throat opening (usually ⅝") and an eye for the splicing of a rope onto the snap. The term snap comes from the action of the hook keeper which is spring loaded. When the hook is engaged over an anchorage, or belt connection, the keeper snaps closed, covering the throat opening of the hook. To remove the hook from the anchorage, one must manually open the keeper.

The double locking snap adds an additional safety feature to the conventional single locking snap. In addition to having to manually open the single lock keeper, the user must first release the double locking mechanism which blocks the movement of the single locking keeper. Two motions are thus required to release the hook from the anchorage. This double locking snap feature adds an additional deterrent against accidental release of the hook from the anchorage.

Prior double lock systems adapted to single lock snaps usually required drilling holes in the strength member of the snap. These holes must be strategically placed and the snap strength reduction due to drilling exactly known. The drilling methods available in the field do not allow for such precise calculations of snap strength reduction. It is, therefore, desirable to provide a double lock snap system which can be adapted to a conventional single lock snap without the necessity of machining the snap body in the field.

The present invention is directed toward solving these problems and provides a workable and ecomonical solution to them.

SUMMARY OF THE INVENTION

A double lock safety hook device adapted to a single lock snap system allows a belt connection, such as a fall protection device, window washer's harness, or the like, to be retained within a single lock snap system. The single lock snap system includes a shank which has a return portion at one end which defines a hook, and a nose spaced from the shank which defines a hook throat. An eyelet is located at the other end of the shank which provides for a means for attaching a load support member, such as a lanyard or the like. The single lock snap system further includes a latch member having one end pivotally mounted on the shank and the other end engageable with the hook nose to close the hook throat. The latch member is displaceable between a closed position, wherein the belt connection is retained within the hook throat by means of the latch member engaging the hook nose, and an open position, wherein the belt connection may be removed from within the hook throat. A latch member spring aids the latch member in moving between its open and closed positions.

While in use, the single lock safety snap or latch member is retained in its closed position by means of an add-on double lock snap hook. The installation of the add-on double lock snap hook herein does not require that holes be drilled within the shank of the single lock snap. Accidental release of the latch member from the hook nose is minimized with the present invention to the same extent as a double lock requiring holes drilled in the shank of the single lock snap.

The double lock snap system herein includes an add-on snap keeper having a generally U-shaped configuration which is positioned in juxtaposition to the shank generally opposite the hook. The keeper is displaceable between first and second positions. In the first position, the keeper engages the latch member allowing the latch member to be retained in its closed position abutting the hook nose. In the second position, the keeper is displaceable remote from the latch member so that the latch member is capable of moving into its open position thereby disengaging the latch member from the hook nose opening the hook throat opening so that the belt connection may be removed from within the hook throat.

The add-on snap keeper includes a rear cover which defines the rear section of the snap keeper. The cover has a first and a second end. A pin extending transversely through the snap keeper engages and retains the second end. The snap keeper includes a recessed groove which receives and retains the first end of the cover. The recessed groove receiving and retaining the first end and the pin engaging and retaining the second end cooperate to retain the cover adjacent the snap keeper. The cover has a plurality of outwardly protruding grip controls which aid in moving the keeper between its first and second positions.

The invention is structured to permit the keeper to be displaced between its first and second positions. A wire form having its upper end encompassing and encircling the eyelet for support and its lower end having a plurality of diverging prongs is positioned generally parallel to the shank with its lower end positioned within the keeper housing. The lower end of the wire form is positioned inside a positional spring. The diverging prongs of the wire form engage the lower portion of the positional spring and provide support for the positional spring when the positional spring is compressed. The upper portion of the positional spring rests against the pin extending transversely through the snap keeper. As the keeper is moved between its first and second positions, the pin resting against the upper portion of the positional spring and the diverging prongs engaging the positional spring lower portion cooperate to force the positional spring to compress. With the snap keeper in the second position, the latch member may be moved into its open position thereby opening the hook throat opening and allowing the belt connection to be removed from within the hook throat.

Other objects and advantages of the invention will become apparent from the following detailed description and from the appended drawings in which like numbers have been used to describe like parts of the several views.

DESCRIPTION OF THE DRAWINGS

FIG. 4 is a front view illustrating the snap keeper in its second position and the latch member movable into its open position.

DESCRIPTION OF THE PREFERRED EMBODIMENT

Figure 1:
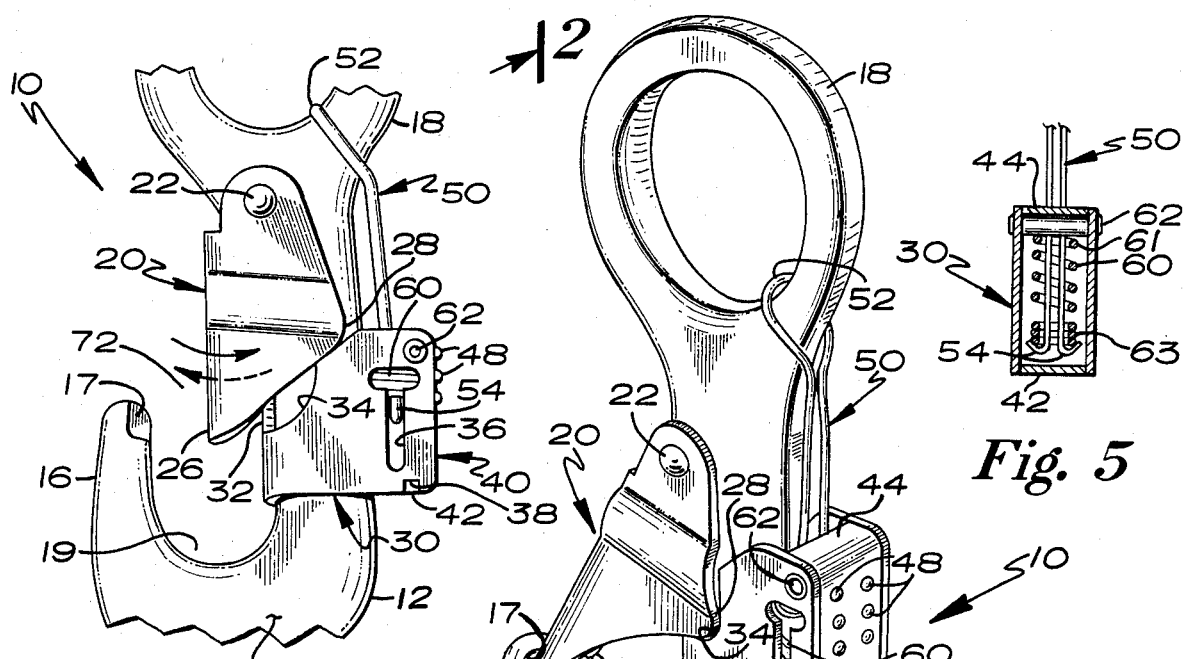
FIG. 1 is a perspective view showing the instant invention installed in a belt connection.

Referring now to FIG. 1, reference numeral 10 generally denotes a double lock safety hook device for use in retaining a belt connection 11, such as fall protection device, window washer's harness, load supports, and the like, within the hook throat 19. The safety hook 10 includes a shank 12 having a hook portion 14 at one end terminating in a nose 16 and an eyelet 18 at the other end. The eyelet 18 provides for a means for attaching a load support member (not shown), such as a lanyard and the like. The nose 16 includes a recessed slot 17.

Figure 2:
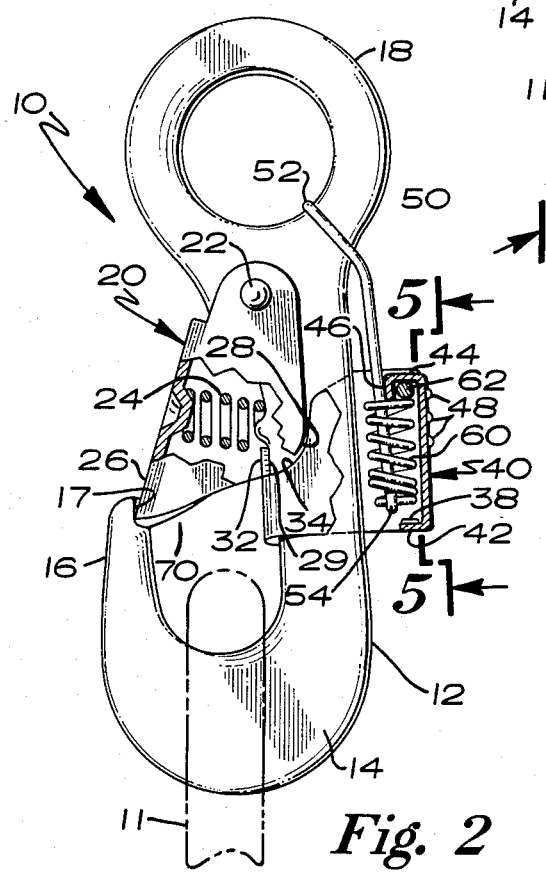
FIG. 2 is a front sectional view taken along line 2—2 of FIG. 1 illustrating the snap keeper in its first position closely abutting the latch member.

A latch member or single lock snap 20 is provided having one end pivotally mounted to the shank 12 at pivot point 22 and the other end engageable with the hook nose 16 with the latch member lip 26 being received and retained by the recessed slot 17 of the nose 16. The latch member 20 also includes a curved edge 28. The opening between the lip 26 of the latch member 20 and the hook nose 16 is referred to as the throat opening 72 as shown in FIG. 4. The latch member 20 is displaceable between a closed position (as shown in FIGS. 1 and 2), wherein the belt connection 11 is retained within the hook throat 19 by means of the latch member 20 engaging the hook nose 16, and an open position (as shown in FIG. 4), wherein the latch member 20 is moved rearwardly opening hook throat opening 72 so that the belt connection 11 may be removed from within hook throat 19. A first spring 24, as illustrated in FIG. 2, facilitates the displacement of the latch member 20 between its open and closed position.

The shank 12, hook 14, nose 16, eyelet 18, and latch member 20 define a currently available single lock snap system. These single lock systems encountered the problem of "roll-out". "Roll-out" is a term which describes a mechanism of accidental release of the snap hook from the anchorage. Release of the snap hook due to "roll-out" can be greatly reduced by two approaches. One approach is to use only that connecting hardware which is "compatible" to the snap hook in use. "Compatible" hardware is so designed as to be of the correct proportions to reduce "roll-out". Unfortunately, not all potential connection points are compatible, nor are all users sufficiently trained to recognize a compatible connection point. Thus, a necessary second approach is to use a double-locking snap system. These double-locking systems can, in many cases, compensate for the noncompatibility of a connection point. Double-locking systems can reduce the probability of (but not eliminate) "roll-out". Ideally, a combination of both approaches should be used.

The double lock snap system 10 herein includes an addon snap keeper 30 which has a generally U-shaped configuration. The snap keeper 30 is positioned generally parallel and in juxtaposition to the shank 12 opposite the hook nose 16. An upwardly extending lip 32 extends from the snap keeper 30 and closely confines the keeper 30 along shank portion 29, as shown in FIG. 2. The keeper 30 also includes an arcuate section 34 which is engageable with the curved edge 28 of the latch member 20. A pin 62 extends transversely through the keeper 30.

The prior art double lock safety snap system usually required holes to be drilled in the shank so that the double lock systems could be mounted adjacent the shaft. These holes had to be strategically placed and the snap strength reduction due to drilling exactly known. Drilling methods currently in the field do not allow for such precise calculation. The present snap keeper 30 is mounted along the shank 12 without the necessity of drilling these holes and has the capability of being an add-on double-lock snap system to existing single lock snaps.

The snap keeper 30 further includes a rear cover 40 which defines the rear section of the keeper 30. The cover has a first end member 42 and a second end member 44. A downwardly protruding flange 46 extends from second end member 44. The pin 62 extending transversely through the keeper 30 and flange 46 retain the second end member 44 and a base notch 38 receives and retains the first end member 42. The pin 62 and notch 38 of keeper 30 cooperate to retain the cover 40 adjacent the keeper 30. A plurality of grip controls 48 extending outwardly from the cover 40 aid the user in moving the keeper 30 along the shank 12.

Figure 5:
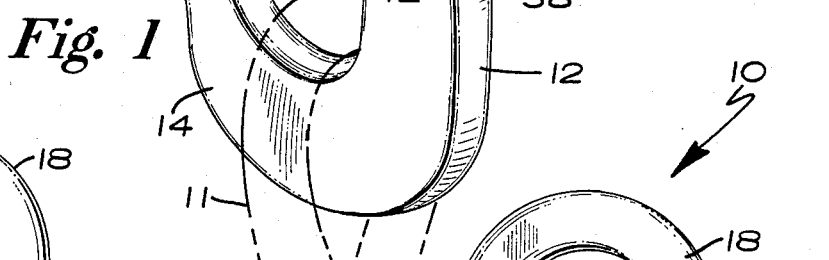
FIG. 5 is a side sectional view taken along line 5—5 of FIG. 2.
Figure 3:
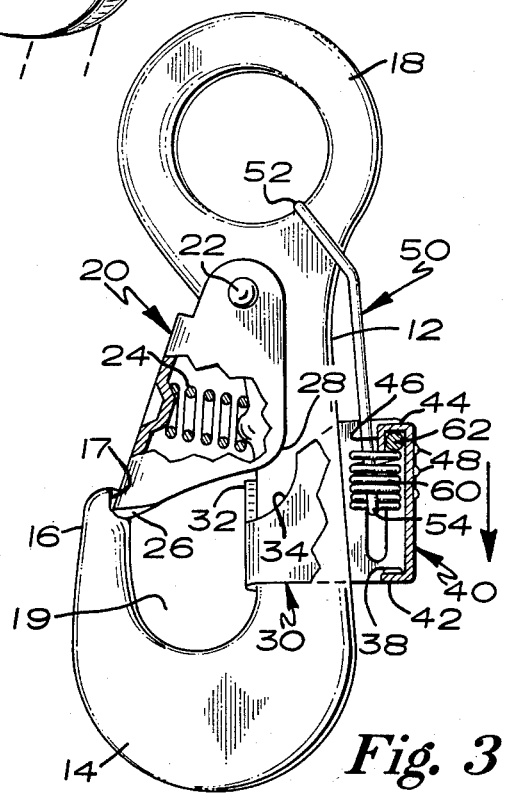
FIG. 3 is a front sectional view of the instant invention illustrating the snap keeper in its second position.

As illustrated in FIGS. 2, 3, and 5, the double lock snap system also discloses a wire form 50 having its upper end 52 in the form of a loop which encircles and encompasses the eyelet 18 for support and a lower end 54 having a plurality of diverging prongs extending therefrom. The wire form 50 is positioned generally parallel to the shank 12 with its lower end 54 positioned within the keeper housing 30. The lower end 54 is positioned inside a positional or second spring 60. The second spring 60 is also located within keeper housing 30. The diverging prongs 54 of the wire form 50 engage the lower portion 63 of the second spring 60, as shown in FIG. 5, and provide support for spring 60 when the positional spring 60 is compressed. The upper portion 61 of the positional spring 60 abuts against the downwardly extending flange 46 and the pin 62 extending transversely through the keeper 30. Two vertical openings 36 in the opposite side walls of keeper 30 permit the diverging prongs 54 to protrude outside of and engage the second spring 60. The arrangement of the downwardly extending flange 46, wire form 60, positional spring 60, and pin 62, provide for a means for positioning the keeper 30 along the shank 12.

The keeper 30 is displaceable between a first position (as shown in FIGS. 1 and 2) and a second position (as shown in FIGS. 3 and 4). In the first position, the keeper 30 engages the latch member 20 allowing the latch member 30 to be held in its closed position abutting the hook nose 16. The arcuate section 34 of the keeper 30 closely abuts the curved edge 28 of the latch member 20 in the keeper first position to hold the latch member 20 in its closed position. In the keeper second position, the keeper 30 is displaceable remote from the latch member 20 so that the latch member 20 is capable of moving into its open position thereby disengaging the latch member 20 from the hook nose 16 opening the hook throat opening 72 so that the belt connection 11 may be removed from within the hook throat 19. As the keeper 30 is moved between its first and second positions, the pin 62 and downwardly extending flange 46 abutting the upper portion 61 of the positional spring 60 and diverging prongs 54 engaging the lower portion 63 of spring 62 cooperate to force the positional spring 60 to compress.

In operation, the belt connection 11 is inserted in the hook throat 19, as shown in FIG. 2, with the latch member 20 in its closed position having the lip 26 of the latch member 20 closely abutting the hook nose 16. The latch member 20 is held in its closed position by means of the keeper 30 engaging the latch member 20. The arcuate section 34 of the keeper 30 closely abuts the curved edge 28 of the latch member 20 minimizing the probability of accidental release of the latch member 20 from the nose 16 so that the belt connection 11 cannot escape through the throat opening.

The keeper 30 may be displaced into its second position by moving the keeper assembly 30 along the shank 12 in the direction of the arrow in FIG. 3. The pin 62 and downwardly extending flange 46 upon this movement force the upper portion 61 of the positional spring 60 toward the lower portion 63 which is stationarily retained by the diverging prongs 54. In the second position, the keeper 30 is disengaged from the latch member 20, as illustrated in FIG. 3.

Once the keeper 30 is in its second position, the latch member 20 may be moved into its open position as shown in FIG. 4. The first spring 24 within the latch member 20 allows the latch member 20 to be moved between open and closed position. After work is finished and the latch member 20 is in the open position, the belt connection 11 may be removed from the hook throat 19 through hook throat opening 72.

As herein disclosed, the structure of the present invention does not require holes to be drilled in the hook body. This structure provides a double lock snap system which can be adapted to a conventional single lock snap without the necessity of machining the snap body in the field.

While the preferred embodiments of the present invention have been described, it should be understood that various changes, adaptations, and modifications may be made therein without departing from the spirit of the invention and the scope of the appended claims.

What is claimed is:

1. A double lock safety hook for reliably retaining a single lock snap system and for anchoring a belt connection, comprising:
   a shank having a return portion at one end thereof to define a hook and having a nose spaced from the shank to define a hook throat;
   means on the other end of said shank for attaching the load support member;
   a latch member having one end pivotally mounted on said shank and the other end engageable with said hook nose to close said hook throat, said latch member is movable between a close position, wherein the belt connection is retained within said hook throat by means of said latch member engaging said hook nose, and an open position, wherein the belt connection may be released from within said hook throat;
   a keeper, slidably mounted on said shank whereby no physical modification of said shank is necessary, said keeper being slidably displaceable along said shank between a first position, wherein said latch member is firmly retained in its closed position engaging said hook nose, and a second position wherein said latch member is capable of moving into its open position disengaging said hook nose and opening said hook throat so that the belt connection may be removed from within said hook throat; and
   means for biasing said keeper toward said first position.

2. The double lock safety hook of claim 1 wherein said latch member includes a first spring for displacing said latch member between its open and closed positions.

3. The double lock safety hook of claim 1 wherein said latch member includes a curved section, said keeper including an arcuate section closely abutting said curved section and retaining said latch member when said latch member is in its closed position.

4. The double lock safety hook of claim 1 wherein said keeper further includes a cover having first and second ends, and a pin which extends transversely through said keeper engaging said second end.

5. The double lock safety hook of claim 4 wherein said cover further includes a plurality of grip controls which aid in moving said keeper between it first and second positions.

6. The double lock safety hook for reliably retaining a single lock snap system and for anchoring a belt connection, comprising:
   a shank having a return portion at one end thereof to define a hook and having a nose spaced from the shank to define a hook throat;
   means on the other end of said shank for attaching the load support member;
   a keeper mounted adjacent to and in juxtaposition with said shank whereby no physical modification of said shank is necessary, said keeper being displaceable between a first position, wherein said latch member is firmly retained in its closed position engaging said hook nose, and a second position wherein said latch member is capable of moving into its open position disengaging said hook nose and opening said hook throat so that the belt connection may be removed from within said hook throat, wherein said keeper further includes a cover having first and second ends, and a pin which extends transversely through said keeper engaging said second end; and
   means for positioning said keeper along said shank to enable said keeper to be moved between its first and second positions wherein said positioning means further includes a second spring positioned between said cover and said shank with one end abutting said pin, and a wire form having one end encompassing and retained by said means for attaching the load support member and the other end including a plurality of diverging prongs which engage the opposite end of said second spring, said prongs and said pin cooperating with said second spring to move said keeper between its first and second positions.

7. The double lock safety hook of claim 4 wherein said keeper further includes a recessed groove for receiving and retaining said first end of the cover, said groove and said pin cooperating in retaining said cover.

8. A double lock safety hook for retaining a single lock snap system and for anchoring a belt connection comprising:
   a shank having a return portion at one end thereof to define a hook and having a nose spaced from the shank to define a hook throat;
   an eyelet on the other hand of said shank for attaching the load support member;
   a latch member having a curved edge and also having one end pivotally mounted on said shank and the other end engageable with said hook nose to close said hook throat; said latch member being movable between a closed position, wherein the belt connection is retained within said hook throat by means of said latch member engaging said hook nose, and an open position, wherein the belt connection may be released from within said hook throat;

a keeper having an arcuate section and mounted adjacent to and in embracing juxtaposition with said shank whereby no physical modification of said shank is necessary, said keeper being movable between a first position, wherein said latch member is held in its closed position engaging said hook nose by means of said arcuate section closely abutting said curved edge, and a second position, wherein said arcuate section of said keeper may disengage said curved edge enabling said latch member to move into its open position disengaging said hook nose and opening said hook throat so that the best connection may be removed from within said hook throat;

a cover mounted adjacent to said keeper and having first and second ends;

said keeper further including a recessed groove for retaining and receiving said first end and a pin extending transversely therethrough engaging said second end and retaining said second end, said groove and said pin cooperating to retain said cover;

a second spring positioned within said keeper between said cover and said shank with one end abutting said pin; and a wire form having one end encompassing said eyelet and the other end including a plurality of diverging prongs which engage one end of said second spring, said prongs and said pin cooperating with said second spring to move said keeper between its first and second positions.

9. The double lock safety hook of claim 8 wherein said latch member includes a first spring for displacing said latch member between its open and closed positions.

10. The double lock safety hook of claim 8 wherein said cover further includes a plurality of grip controls which aid in moving said keeper between its first and second positions.

* * * * *

UNITED STATES PATENT AND TRADEMARK OFFICE
CERTIFICATE OF CORRECTION

PATENT NO. : 4,539,732
DATED : September 10, 1985
INVENTOR(S) : James T. Wolner

It is certified that error appears in the above-identified patent and that said Letters Patent are hereby corrected as shown below:

In claim 8, column 6, line 61, change "hand" after "other" to --end--.

In claim 8, column 7, line 16, change "best" at the end of the line to --belt--.

Signed and Sealed this

Fourteenth Day of January 1986

[SEAL]

Attest:

DONALD J. QUIGG

Attesting Officer

Commissioner of Patents and Trademarks